United States Patent [19]

Hamada

[11] Patent Number: 5,090,668
[45] Date of Patent: Feb. 25, 1992

[54] DYNAMIC DAMPER

[75] Inventor: Masaaki Hamada, Komaki, Japan

[73] Assignee: Tokai Rubber Industries, Ltd., Komaki, Japan

[21] Appl. No.: 554,894

[22] Filed: Jul. 20, 1990

[30] Foreign Application Priority Data

Jul. 20, 1989 [JP] Japan .............................. 1-85506[U]
Jul. 20, 1989 [JP] Japan .............................. 1-85507[U]

[51] Int. Cl.$^5$ .............................................. F16F 15/00
[52] U.S. Cl. ........................................ 267/141; 74/574
[58] Field of Search ............... 248/559, 636, 562, 565; 188/378, 379; 74/574; 267/141, 141.1, 141.2, 153; 464/180

[56] References Cited

U.S. PATENT DOCUMENTS

| | | | |
|---|---|---|---|
| 1,934,597 | 11/1933 | Föppl . | |
| 2,154,442 | 4/1939 | Dichl | 188/378 |
| 3,128,978 | 4/1964 | Sykes . | |
| 3,199,186 | 8/1965 | Simpson | 74/574 X |
| 3,670,593 | 6/1972 | Troyer | 188/378 X |
| 4,049,985 | 9/1977 | Sudler | 188/378 X |
| 4,150,587 | 4/1979 | Brener, Jr. | 74/574 |
| 4,223,565 | 9/1980 | Sugiyama et al. . | |
| 4,254,847 | 3/1981 | Kamman et al. | 188/379 |
| 4,640,216 | 2/1987 | Lehmann et al. | 188/379 X |
| 4,771,842 | 9/1988 | Mishio et al. | 464/180 X |
| 4,781,654 | 11/1988 | Walter et al. | 74/574 X |
| 4,873,888 | 10/1989 | Matsuyama | 188/378 X |
| 4,884,666 | 12/1989 | Stahl | 188/378 |

FOREIGN PATENT DOCUMENTS

| | | | |
|---|---|---|---|
| 0091656 | 10/1983 | European Pat. Off. | 74/574 |
| 356917 | 3/1990 | European Pat. Off. . | |
| 0623562 | 12/1933 | Fed. Rep. of Germany | 74/574 |
| 0632017 | 12/1927 | France | 188/378 |
| 0177619 | 4/1922 | United Kingdom | 74/574 |

Primary Examiner—Ramon O. Ramirez
Assistant Examiner—Robert A. Olson
Attorney, Agent, or Firm—Fleit, Jacobson, Cohn, Price, Holman & Stern

[57] ABSTRACT

Disclosed are dynamic dampers for suppressing harmful vibrations excited in a rotary shaft which enable to complete the installation thereof around the rotary shaft by only fixing one end thereof on the rotary shaft without imparing the performances thereof. One of the dynamic dampers are provided with elastic members disposed at both ends thereof, only one of the elastic members has an engaging groove going round the outer surface thereof, and the inner diameter of one of the elastic members is made larger than that of the other elastic member. The other dynamic damper is provided with elastic members disposed at both ends thereof, the elastic members have a supporting portion and an elastic portion, and only one of the supporting portion has a fixing portion having an engaging groove going round the outer surface thereof and an intermediate portion, the length of the intermediate portion is larger than the length of the supporting portion of the other elastic member in the axial direction of the rotary shaft. With these arrangements, the dynamic dampers are free from the influence of the deformations resulting from the fixing at one end thereof only. Thus, the dynamic dampers enable to reduce the number of component parts, improve the assembly operability and reduce the manufacturing cost as well.

10 Claims, 3 Drawing Sheets ial view is illustrated in FIG. 5 has been used for a
DYNAMIC DAMPER

BACKGROUND OF THE INVENTION

1. Field of the Invention

The present invention relates to a dynamic damper installed around a rotary shaft, such as a drive shaft of an automobile. The dynamic damper is for suppressing harmful vibrations occurred in the rotary shaft. More particularly, the present invention relates to a dynamic damper which enables to complete the installation thereof around the rotary shaft by fixing one end thereof only to the rotary shaft while maintaining the performances thereof, thereby reducing the manufacturing cost and improving the assembly operability.

2. Related Art Statement

When a rotary shaft, such as a drive shaft and a propeller shaft of an automobile and the like, rotates, unbalanced rotations occur. As a result of the unbalanced rotations, there occurs harmful vibrations like bending vibrations and torsional vibrations. It is naturally preferred that the harmful vibrations should not occur at all. However, various dynamic dampers have been widely used to suppress the harmful vibrations. The dynamic dampers work in the following manner: The dynamic dampers adjust their intrinsic frequencies to the dominant frequencies of the harmful vibrations excited in the rotary shaft, convert the vibration energy of the rotary shaft to the vibration energy of the dynamic dampers by resonance, and absorbs the vibration energy of the rotary shaft.

A conventional dynamic damper whose cross sectional view is illustrated in FIG. 5 has been used for a drive shaft and the like of an automobile. The dynamic damper 600 has a fixing member 601 inserted into and supported by a rotary shaft "S", a cylinder-shaped mass member 602 disposed around the outer periphery of the fixing member 601, and an elastic member 603 disposed between the fixing member 601 and the mass member 602 and connecting the fixing member 601 and the mass member 602.

The intrinsic frequency of this dynamic damper 600 is fundamentally determined by the mass of the mass member 602 and the spring constant of the elastic member 603. The elastic member 603 is subjected to loads in the compression/tensile direction with respect to the vibration of the mass member 602. As a result, the elastic member 603 supports the mass member 602 in the direction exhibiting the compression/tensile spring constant.

The inventor of the present invention proposed a dynamic damper illustrated in FIG. 4 under Japanese patent application No. 213289/1988 which is not laid open at the time of the present application and therefore is not classified as a prior art. The dynamic damper 100 of the earlier application is formed integrally of the following: a pair of fixing members 110, 110 formed in a ring shape; a mass member 120 having an inner surface larger than the outer surface of the rotary shaft "S" and inserted into the rotary shaft "S"; and a pair of elastic members 130, 130 formed in a hollow truncated cone shape and connecting the ends of the fixing members 110, 110 with the ends of the mass member 120. Further, engaging grooves 110a, 110a are formed on the outer surface of the pair of fixing members 110, 110 in a manner going round the outer surface of the fixing members 110, 110, and fixing bands 110b, 110b made of stainless steel and the like are installed around the engaging grooves 110a, 110a, thereby fixing the dynamic damper 100 around the rotary shaft "S". Here, the elastic members 130, 130 support the mass member 120 in the shear direction.

In the above-mentioned conventional dynamic damper 600, the outer diameter thereof tends to increase because the fixing member 601, the elastic member 603 and the mass member 602 are laminated. In addition, when the intrinsic frequency of the dynamic damper 600 should be set in a lower value, the spring constant of the elastic member 603 should be set in a smaller value, or the mass of the mass member 602 should be made greater. However, the shape of the elastic member 603 should be made longer in the vibration direction in order to set the spring constant thereof in a smaller value. This means that the outer diameter of the dynamic damper 600 should be made much greater. Furthermore, the mass of the mass member 602 should be made greater in order to increase the mass of the mass member 602. In this case again, it is inevitable that the outer diameter of the dynamic damper 600 should be made much greater. In this way, it is hard to down-size the conventional dynamic damper 600 while maintaining the performances thereof.

The dynamic damper 100 proposed by the inventor of the present invention under Japanese patent application No. 213289/1988 solves the above-mentioned problems of the conventional dynamic damper 600. To be critical, however, the dynamic damper 100 is slightly poor in the assembly operability because it is installed around the rotary shaft "S" by installing the fixing bands 110b, 110b around the fixing members 110, 110 disposed at the both ends thereof.

SUMMARY OF THE INVENTION

It is therefore an object of the present invention to provide a dynamic damper which enables to complete the installation thereof around the rotary shaft by fixing one end thereof only, thereby reducing the manufacturing cost and improving the assembly operability.

In one aspect of the present invention, a dynamic damper according to the present invention comprises: a mass member formed in a cylinder shape, having an inner surface larger than the outer surface of a rotary shaft and inserted onto the rotary shaft; a first elastic member having a first fixing portion formed in a ring shape, inserted onto and supported by the rotary shaft and a first elastic portion integrally connecting the first fixing portion and on end of the mass member; a second elastic member having a second fixing portion formed in a ring shape, inserted onto and supported by the rotary shaft and a second elastic portion integrally connecting the second fixing portion and the other end of the mass member; and the first fixing portion of the first elastic member having an engaging groove formed in a ring shape in a manner going round the outer surface thereof, and the inner diameter of the first fixing portion thereof is larger than the inner diameter of the second fixing portion of the second elastic member.

In the dynamic damper according to the one aspect of the present invention, the inner diameter of the first fixing portion of the first elastic member is larger than the inner diameter of the second fixing portion of the second elastic member, and only the first fixing portion of the first elastic member has an engaging groove formed in a ring shape in a manner going round the outer surface of the first fixing portion.

When a dynamic damper employs such arrangements, a tightening allowance for fixing the first fixing portion of the first elastic portion on the rotary shaft can be set smaller than a tightening allowance for fixing the second fixing portion of the second elastic member thereon. As a result, the first fixing portion of the first elastic portion of the dynamic damper can be engaged with the rotary shaft in a degree equal to a degree of the engagement between the second fixing portion of the second elastic portion and the rotary shaft, thereby eliminating unbalance between the degree of engagements at both ends of the dynamic damper. Therefore, even when only the first fixing portion of the first elastic portion is fixed on the rotary shaft with a fixing band, the shear spring constants exhibited by the first elastic portion of the first elastic member agree with the shear spring constants exhibited by the second elastic portion of the second elastic member. Hence, no resonance occurs except at the intrinsic frequency of the dynamic damper adjusted to the dominant frequencies of the harmful vibrations excited in the rotary shaft.

In this way, the dynamic damper according to the one aspect of the present invention enables to complete the installation thereof around the rotary shaft by fixing one end thereof only. Accordingly, the number of the component parts and the man-hour requirements for the assembly have been reduced. Therefore, it is possible to improve the assembly operability and reduce the manufacturing cost.

In another aspect of the present invention, a dynamic damper according to the present invention comprises: a mass member formed in a cylinder shape, having an inner surface larger than the outer surface of a rotary shaft and inserted into the rotary shaft; and a pair of elastic members disposed at both ends of the mass member, and the elastic member having a supporting portion formed in a ring shape, inserted onto and supported by the rotary shaft and an elastic portion integrally connecting the supporting portion with one end of the mass member; and the supporting portion of one of the elastic members having a fixing portion having an engaging groove formed in a ring shape in a manner going round the outer surface thereof, and an intermediate portion disposed between the fixing portion and the elastic portion and having a length at least equal to or larger than the length of the supporting portion of the other elastic member in the axial direction of the rotary shaft.

In the dynamic damper according to another aspect of the present invention, the fixing portion is provided only in the supporting portion of one of the elastic members, the engaging groove is formed on the fixing portion in a ring shape in a manner going round the outer surface of the fixing portion. Further, the intermediate portion is disposed between the fixing portion and the elastic portion. Furthermore, the length of the intermediate portion in the axial direction of the rotary shaft is formed equal to or larger than the length of the supporting portion of the other elastic member in the axial direction of the rotary shaft.

When a dynamic damper employs such arrangements and when the dynamic damper is installed around the rotary shaft by installing a fixing band only around the supporting portion of the elastic member in which the fixing portion is provided and the engaging groove is formed on the outer surface of the fixing portion in a manner going round the outer surface thereof, the intermediate portion blocks, relieves and absorbs the influences resulting from the deformations of the fixing portion thus fixed. Accordingly, the influences do not reach the elastic portion of the elastic member in which the fixing portion and the intermediate portion are provided. Therefore, when the rotary shaft rotates, the shear spring constants exhibited by the elastic portion of one of the elastic members, in which the supporting portion is provided with the fixing portion, the fixing portion is provided with the engaging groove going round the outer surface thereof, the intermediate portion is disposed between the fixing portion and the elastic portion, and the length of the intermediate portion in the axial direction of the rotary shaft is made at least equal to or larger than that of the supporting portion of the other elastic member, agree with the shear spring constants exhibited by the elastic portion of the other elastic member which is free from such arrangements. Hence, no resonance occurs except at the intrinsic frequency of the dynamic damper adjusted to the dominant frequencies of the harmful vibrations excited in the rotary shaft.

Likewise, the dynamic damper according to another aspect of the present invention also enables to complete the installation thereof around the rotary shaft by fixing one end thereof only. Accordingly, the number of the component parts and the man-hour requirements for the assembly have been also reduced. Therefore, it is also possible to improve the assembly operability and reduce the manufacturing cost.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS OF THE INVENTION

Having generally described the present invention, a further understanding can be obtained by reference to certain specific preferred embodiments which are provided herein for purposes of illustration only and are not intended to be limiting unless otherwise specified.

[First Preferred Embodiment]

A dynamic damper of a first preferred embodiment according to the present invention will be hereinafter described with reference to FIGS. 1 and 2.

Figure 1:
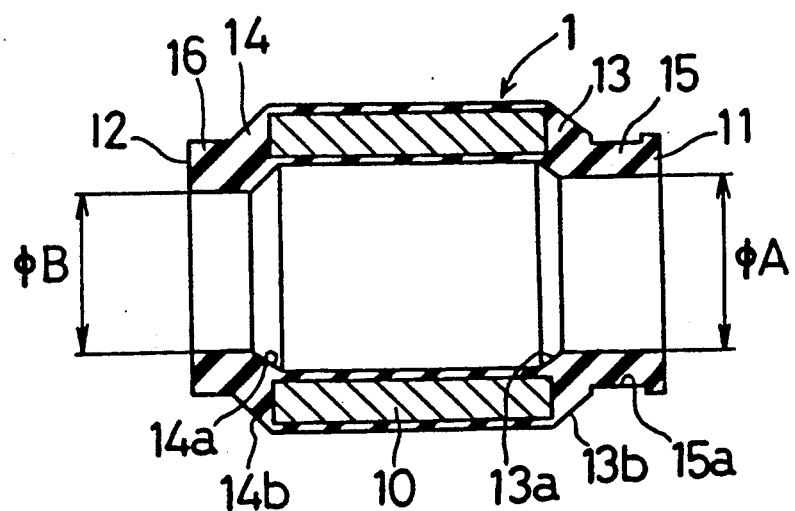
FIG. 1 is a cross sectional view of a dynamic damper of a first preferred embodiment according to the present invention, in which the dynamic damper is cut along the central axis thereof.

FIG. 1 is a cross sectional view of the dynamic damper of the first preferred embodiment, in which the dynamic damper is cut along the central axis thereof. FIG. 2 is a cross sectional view of the dynamic damper thereof installed around a rotary shaft.

The dynamic damper 1 of the first preferred embodiment comprises: a mass member 10 formed in a cylindrical shape; a first elastic member 11 formed integrally with the mass member 10 and a second elastic member 12 formed integrally with the mass member 10. This dynamic damper 1 is formed integrally, and has a cylindrical shape as a whole in which the outer diameter at the middle portion is larger than the outer diameters at both ends.

The mass member 10 has an inner surface larger than the outer surface of a rotary shaft "S", and is inserted into the rotary shaft "S". The mass member 10 has a mass body made of metal such as a thick-wall cylinder-shaped steel pipe. When the dynamic damper 1 is molded integrally by vulcanization molding with a mold, the outer and inner surfaces of the mass member 10 are coated with a rubber material such as natural rubber and the like constituting the first and second elastic members 11 and 12 by the thickness of approximately 1 mm. The cylindrical mass body made of metal thus coated with the rubber material is disposed around the outer circumference of the rotary shaft "S", and integrally works as the mass member 10. Here, there is formed a clearance of approximately 1.5 mm between the inner surface of the mass member 10 and the outer surface of the rotary shaft "S".

The first elastic member 11 has a first fixing portion 15 formed in a ring shape and a first elastic portion 13 formed in a hollow truncated cone, and is formed of a rubber material such as natural rubber and the like. The first fixing portion 15 is inserted onto and supported by the rotary shaft "S".

The inner diameter ($\phi$A) of the ring shaped first fixing portion 15 is formed so that it is larger than the inner diameter ($\phi$B) of the second fixing portion 16 of the second elastic member 12 (described later) in the following manner. Namely, when the outer diameter of the rotary shaft "S" is $\phi$C, the inner diameter ($\phi$A) of the first fixing portion 15 of the first elastic portion 11 is set according to the following formula: $\phi A = \phi C - (0.5$ to $1.0)$ (mm), and the inner diameter ($\phi$B) of the second fixing portion 16 of the second elastic member 12 is set according to the following formula: $\phi B = \phi C - (1.2$ to $2.5)$ (mm). Thus, $\phi$A is set larger than $\phi$B, i.e., $\phi A > \phi B$. Here, it is preferable to set the inner diameter ($\phi$A) of the first fixing portion 15 of the first elastic portion 11 so as to fall in the range of 94 to 99% of the dimension of the outer diameter ($\phi$C) of the rotary shaft "S", and to set the inner diameter ($\phi$B) of the second fixing portion 16 of the second elastic portion 12 so as to fall in the range of 87 to 96% of the dimension of the outer diameter ($\phi$C) of the rotary shaft "S", and to set $\phi$A larger than $\phi$B ($\phi A > \phi B$).

Thus, the tightening allowance for fixing the first fixing portion 15 of the first elastic member 11 around the rotary shaft "S" is set smaller than the tightening allowance for fixing the second fixing portion 16 of the second elastic member 12 around the rotary shaft "S". Further, a ring-shaped engaging groove 15a is formed on the outer surface of the first fixing portion 15 in a manner going round the outer surface thereof.

The first elastic portion 13, formed in a hollow truncated cone shape, connects the first fixing portion 15 of the first elastic member 11 and one end of the mass member 10 integrally in the following manner. Namely, the inner surface 13a of the first elastic portion 13 is formed in a tapered shape, i.e., the inner surface 13a of the first elastic portion 13 starts at the inner surface end of the first fixing portion 15 to be brought into close contact with the outer surface of the rotary shaft "S", and reaches the inner surface end of the mass member 10 while gradually increasing the inner diameter thereof. Further, the outer surface 13b of the first elastic portion 13 is formed also in a tapered shape, i.e., the outer surface 13b of the first elastic portion 13 starts at the outer surface end of the first fixing portion 15, and reaches the outer surface end of the mass member 10 while gradually increasing the outer diameter thereof.

The second elastic member 12 has a second fixing portion 16 formed in a ring shape and a second elastic portion 14 formed in a hollow truncated cone, and is formed of a rubber material such as natural rubber and the like. The second fixing portion 16 is inserted into and supported by the rotary shaft "S".

The inner diameter ($\phi$B) of the ring-shaped second fixing portion 16 is formed so that it is smaller than the inner diameter ($\phi$A) of the first fixing portion 15 of the first elastic member 11 in the above-mentioned manner. Namely, the tightening allowance for fixing the second fixing portion 16 of the second elastic member 12 around the rotary shaft "S" is set larger than the tightening allowance for fixing the first fixing portion 15 of the first elastic member 11 around the rotary shaft "S".

The second elastic portion 14, formed in a hollow truncated cone shape, connects the second fixing portion 16 of the second elastic member 12 and one end of the mass member 10 integrally in the following manner. Namely, the inner surface 14a of the second elastic portion 14 is formed in a tapered shape, i.e., the inner surface 14a of the second elastic portion 14 starts at the inner surface end of the second fixing portion 16 to be brought into close contact with the outer surface of the rotary shaft "S", and reaches the inner surface end of the mass member 10 while gradually increasing the inner diameter thereof. Further, the outer surface 14b of the second elastic portion 14 is formed also in a tapered shape, i.e., the outer surface 14b of the second elastic portion 14 starts at the outer surface end of the second fixing portion 16, and reaches the outer surface end of the mass member 10 while gradually increasing the outer diameter thereof.

The dynamic damper 1 arranged as described above is installed around the rotary shaft "S" and used in the following manner. When installing the dynamic damper 1 around the rotary shaft "S", the inner surface of the first fixing portion 15 of the first elastic member 11 of the dynamic damper 1 is placed on the shaft end of the rotary shaft "S" before mounting the rotary shaft "S" on an automobile body. Because the inner diameter of the first fixing portion 15 of the first elastic member 11 is made smaller than the outer diameter of the rotary shaft "S" by 0.5 to 1.0 mm, the rotary shaft "S" is press-fitted onto the first fixing portion 15 while pressing and expanding the inner surface of the first fixing portion 15. Similarly, because the inner diameter of the second fixing portion 16 of the second elastic member 12 is made smaller than the outer diameter of the rotary shaft "S" by 1.2 to 2.5 mm, the rotary shaft "S" is press-fitted onto the second fixing portion 16 while further pressing and expanding the inner surface of the second fixing portion 16, when the rotary shaft "S" is further inserted into the dynamic damper 1. After disposing the dynamic damper 1 at a predetermined position of the rotary shaft "S" in this manner, the engaging groove 15a formed in the first fixing portion 15 is fixed by installing the fixing band 15b therearound, whereby the dynamic damper 1 is fixed around the rotary shaft "S".

Figure 2:
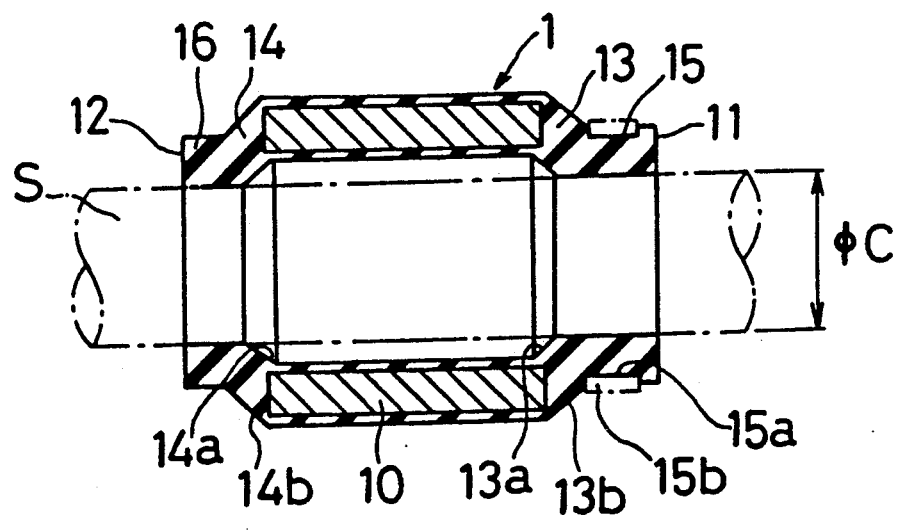
FIG. 2 is a cross sectional view of the dynamic damper thereof installed around a rotary shaft.

FIG. 2 illustrates the cross sectional view of the dynamic damper 1 installed around the rotary shaft "S" in the above-mentioned manner. In the state illustrated in FIG. 2, the first fixing portion 15 of the first elastic member 11 of the dynamic damper 1 is firmly pressed by the fixing band 15b in the central axis direction thereof. Accordingly, the degree of the force fixing the first fixing portion 15 of the first elastic member 11 around the rotary shaft "S" is made substantially equal to the degree of the force fixing the second fixing portion 16 of the second elastic member 12 around the rotary shaft "S" by installing the fixing band 15b around the engaging groove 15a of the first fixing portion 15 of the first elastic member 11. In this way, the first fixing portion 15 of the first elastic member 11 and the second fixing portion 16 of the second elastic member 12 are brought into close contact with the rotary shaft "S". Here, the degrees of the forces fixing the first fixing portion 15 and the second fixing portion 16 around the rotary shaft "S" are made substantially equal to each other, and accordingly the first fixing portion 15 and the second fixing portion 16 can be brought into close contact with the rotary shaft "S". These effects result from the arrangement that the inner diameter of the first fixing portion 15 is made larger than the inner diameter of the second fixing portion 16.

When the rotary shaft "S" rotates and harmful vibrations are excited, the mass member 10 of the dynamic damper 1 resonates because the intrinsic frequency of the mass member 10 is adjusted to the frequencies of the harmful vibrations. The adjustment of the intrinsic frequency is performed by varying the configurations of the first elastic portion 13 of the first elastic member 11 and the second elastic portion 14 of the second elastic member 12. Here, only the first fixing portion 15 of the first fixing member 11 are fixed by the fixing band 15b, but the deformation of the first elastic portion 13 of the first elastic member 11 does not differ from the deformation of the second elastic portion 14 of the second elastic member 12 during the rotation of the rotary shaft "S" because the degree of the engagement between the first fixing portion 15 and the rotary shaft "S" and the degree of the engagement between the second fixing portion 16 and the rotary shaft "S" are equal to each other as aforementioned. Therefore, the shear spring constants exhibited in the first elastic portion 13 of the first elastic member 11 do not differ from the shear spring constants exhibited in the second elastic portion 14 of the second elastic member 12, and accordingly no resonance occurs except at the intrinsic frequency of the dynamic damper 1 adjusted to the dominant frequencies of the harmful vibrations excited in the rotary shaft "S".

In this way, the dynamic damper 1 of the first preferred embodiment can be fixed around the rotary shaft "S" by installing the fixing band 15b only around the fixing portion 15 of the first elastic member 11 without imparing its inherent performances. As a result, the number of the component parts and the man-hour requirements for the assembly have been reduced. Therefore, the assembly operability can be improved and the manufacturing cost can be reduced by employing the dynamic damper 1 of the first preferred embodiment arranged in the above-mentioned manner.

[Second Preferred Embodiment]

Figure 3:
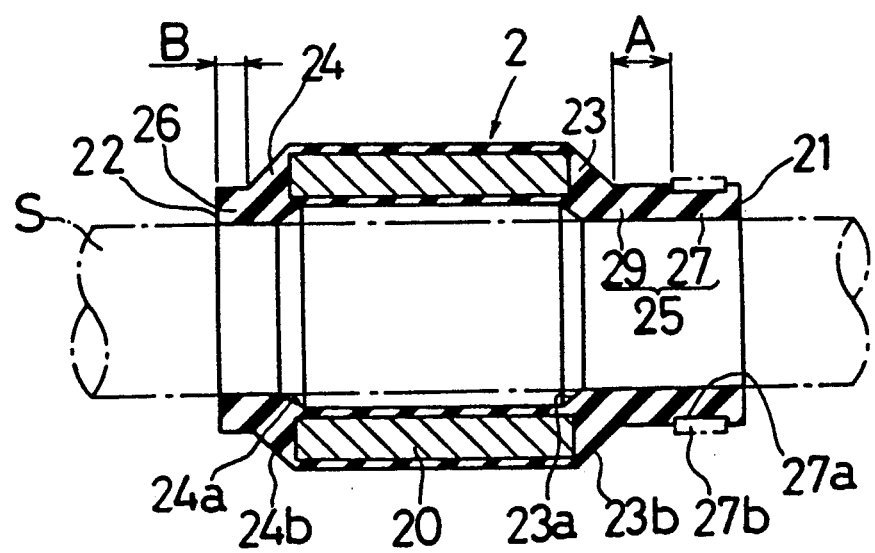
FIG. 3 is a cross sectional view of a dynamic damper of a second preferred embodiment according to the present invention, in which the dynamic damper is cut along the central axis thereof.
Figure 4:
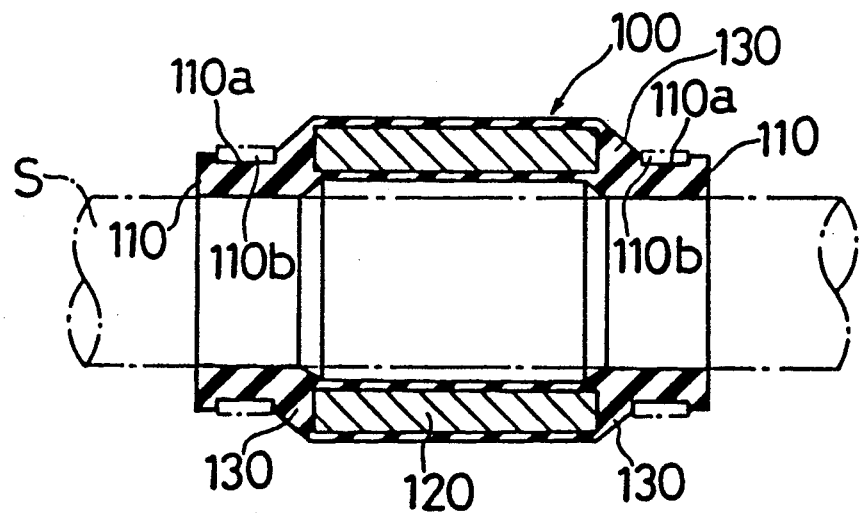
FIG. 4 is a cross sectional view of a dynamic damper proposed by the inventor of the present invention under Japanese patent application No. 213289/1988 (not a prior art), in which the dynamic damper is cut along the central axis thereof.
Figure 5:
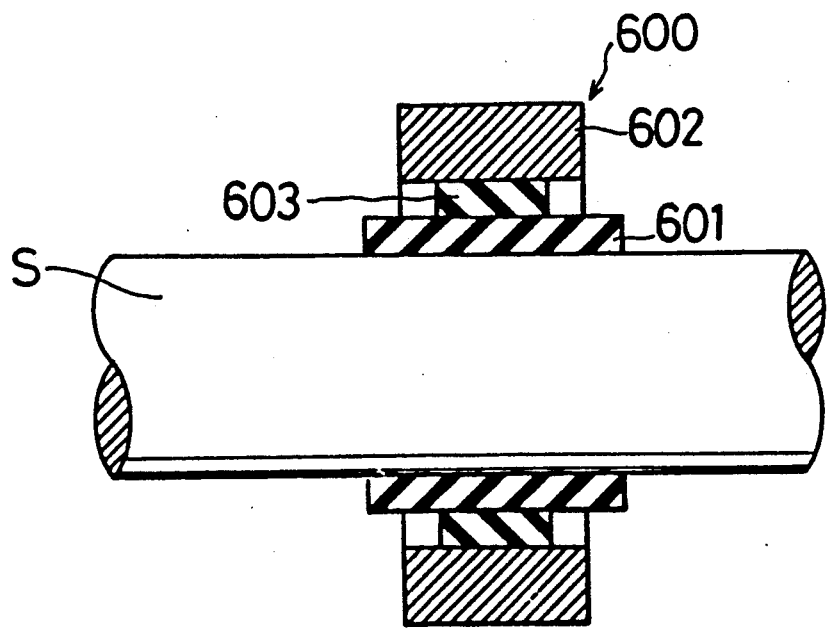
FIG. 5 is a schematic cross sectional view of a conventional dynamic damper.

A dynamic damper of a second preferred embodiment according to the present invention will be hereinafter described with reference to FIG. 3. FIG. 3 is a cross sectional view of the dynamic damper of the second preferred embodiment, in which the dynamic damper is cut along the central axis thereof.

The dynamic damper 2 of the second preferred embodiment comprises: a mass member 20 formed in a cylindrical shape; and a pair of elastic members 21 and 22 disposed at both ends of the mass member 20 and formed integrally with the mass member 20. This dynamic damper 2 is formed integrally, and has a cylindrical shape as a whole in which the outer diameter at the middle portion is larger than the outer diameters at both ends.

Further, only the elastic member 21 of the pairs of the elastic members 21 and 22 is provided with a supporting portion 25 which has a fixing portion 21 having an engaging groove 27a going round the outer surface thereof and an intermediate portion 29 disposed between the fixing portion 27 and an elastic portion 23. Furthermore, the length (A) of the intermediate portion 29 in the axial direction of the rotary shaft "S" is made larger than the length (B) of a supporting portion 26 of the other elastic member 22 in the axial direction of the rotary shaft "S" by 3 mm. Here, when the length (B) of the supporting portion 26 of the other elastic member 22 in the axial direction of the rotary shaft "S" can be set at 5 mm or more, the length (A) of the intermediate portion 29 in the axial direction of the rotary shaft "S" may be made equal to the length (B) of the supporting portion 26 in the axial direction of the rotary shaft "S".

The mass member 20 has an inner surface larger than the outer surface of a rotary shaft "S", and is inserted into the rotary shaft "S". The mass member 20 has a mass body made of metal such as a thick-wall cylinder-shaped steel pipe. When the dynamic damper 2 is molded integrally by vulcanization molding with a mold, the outer and inner surfaces of the mass member 20 are coated with a rubber material such as natural rubber and the like constituting the elastic members 21 and 22 by the thickness of approximately 1 mm. The cylindrical mass body made of metal thus coated with the rubber material is disposed around the outer circumference of the rotary shaft "S", and integrally works as the mass member 20. Here, there is formed a clearance of approximately 1.5 mm between the inner surface of the mass member 20 and the outer surface of the rotary shaft "S".

The elastic member 21, one of the elastic members 21 and 22 has the supporting portion 25 formed in a ring shape and the elastic portion 23 formed in a hollow truncated cone, and is formed of a rubber material such as natural rubber and the like. The ring-shaped supporting portion 25 is inserted onto and supported by the rotary shaft "S". Here, the inner diameter of the ring-shaped supporting portion 25 is made smaller than the outer diameter of the rotary shaft "S" by 1 mm.

The ring-shaped supporting portion 25 further has the fixing portion 27 having the engaging groove 27a going round the outer surface thereof and the intermediate portion 29 disposed between the fixing portion 27 and the elastic portion 23 and connecting them integrally. As aforementioned, the length (A) of the intermediate portion 29 in the axial direction of the rotary shaft "S" is made larger than the length (B) of the supporting portion 26 of the other elastic member 22 by approximately 3 mm, i.e., "A" > "B".

The elastic portion 23, formed in a hollow truncated cone shape, connects the intermediate portion 29 of the supporting portion 25 of the elastic member 21 and one end of the mass member 20 integrally in the following manner. Namely, the inner surface 23a of the elastic portion 23 is formed in a tapered shape, i.e., the inner surface 23a of the elastic portion 23 starts at the inner surface end of the intermediate portion 29 to be brought into close contact with the outer surface of the rotary shaft "S", and reaches the inner surface end of the mass member 20 while gradually increasing the inner diameter thereof. Further, the outer surface 23b of the elastic portion 23 is formed also in a tapered shape, i.e., the outer surface 23b of the elastic portion 23 starts at the outer surface end of the intermediate portion 29, and reaches the outer surface end of the mass member 20 while gradually increasing the outer diameter thereof.

The other elastic member 22 has the supporting portion 26 formed in a ring shape and an elastic portion 24 formed in a hollow truncated cone, and is formed of a rubber material such as natural rubber and the like. The ring-shaped supporting portion 26 is inserted onto and supported by the rotary shaft "S". Here, the inner diameter of the ring-shaped supporting portion 26 is made smaller than the outer diameter of the rotary shaft "S" by 1 mm.

The other elastic member 22 differs from the elastic member 21 in that the ring-shaped supporting portion 26 does not have a fixing portion having an engaging groove going round the outer surface thereof and an intermediate portion, and that the supporting portion 26 and the elastic portion 24 are directly connected without an intermediate portion. As aforementioned, the length (B) of the supporting portion 26 of the elastic member 22 in the axial direction of the rotary shaft "S" is made smaller than the length (A) of the intermediate portion 29 of the elastic member 21 by approximately 3 mm.

The elastic portion 24, formed in a hollow truncated cone shape, connects the supporting portion 26 of the elastic member 22 and one end of the mass member 20 integrally in the following manner. Namely, the inner surface 24a of the elastic portion 24 is formed in a tapered shape, i.e., the inner surface 24a of the elastic portion 24 starts at the inner surface end of the supporting portion 26 to be brought into close contact with the outer surface of the rotary shaft "S", and reaches the inner surface end of the mass member 20 while gradually increasing the inner diameter thereof. Further, the outer surface 24b of the elastic portion 24 is formed also in a tapered shape, i.e., the outer surface 24b of the elastic portion 24 starts at the outer surface end of the supporting portion 26, and reaches the outer surface end of the mass member 20 while gradually increasing the outer diameter thereof.

The dynamic damper 2 arranged as described above is installed around the rotary shaft "S" and used in the following manner. When installing the dynamic damper 2 around the rotary shaft "S", the central axis bore of the supporting portion 25 of the elastic member 21 of the dynamic damper 2 is placed on the shaft end of the rotary shaft "S" before mounting the rotary shaft "S" on an automobile body. Because the inner diameter of the supporting portion 25 of the elastic member 21 is made smaller than the outer diameter of the rotary shaft "S" by 1.0 mm, the rotary shaft "S" is press-fitted onto the supporting portion 15 while pressing and expanding the inner surface of the supporting portion 25. Similarly, because the inner diameter of the supporting portion 26 of the elastic member 22 is also made smaller than the outer diameter of the rotary shaft "S" by 1.0 mm, the rotary shaft "S" is press-fitted onto the supporting portion 26 while similarly pressing and expanding the inner surface of the supporting portion 26, when the rotary shaft "S" is further inserted into the dynamic damper 2. After disposing the dynamic damper 2 at a predetermined position of the rotary shaft "S" in this manner, the engaging groove 27a formed in the supporting portion 25 of the elastic member 21 is fixed by installing the fixing bands 27b therearound, whereby the dynamic damper 2 is fixed around the rotary shaft "S".

FIG. 3 illustrates the cross sectional view of the dynamic damper 2 installed around the rotary shaft "S" in the above-mentioned manner. In the state illustrated in FIG. 3, the inner surface of the supporting portion 25 of the elastic member 21 of the dynamic damper 2 and the inner surface of the supporting portion 26 of the elastic member 22 thereof are brought into close contact with the outer surface of the rotary shaft "S". Further, the fixing portion 27 of the supporting portion 25 of the elastic member 21 is pressed firmly and deformed in the central axis direction thereof by the fixing band 17b which is installed around the engaging groove 27a going round the outer surface of the fixing portion 27. However, the deformation of the fixing portion 27 thus fixed is blocked, relieved and absorbed, because the intermediate portion 29 is disposed between the fixing portion 27 and the elastic portion 23 and because the length (A) of the intermediate portion 29 in the axial direction of the rotary shaft "S" is made larger than the length (B) of the supporting portion 26 of the elastic member 22 by approximately 3 mm. Accordingly, the deformation of the fixing portion 27 fixed with the fixing band 27b does not influence on the elastic portion 23 of the elastic member 21 at all.

When the rotary shaft "S" rotates and harmful vibrations are excited, the mass member 20 of the dynamic damper 2 resonates because intrinsic frequency of the mass member 20 is adjusted to the frequencies of the harmful vibrations. The adjustment of the intrinsic frequency is performed by varying the configurations of the elastic portion 23 of the elastic member 21 and the elastic portion 24 of the elastic member 22. Here, only the fixing portion 27 of the supporting portion 25 are pressed and fixed firmly with the fixing band 17b in the central direction, but the deformation of the fixing portion 27 thus pressed and fixed firmly does not interfere with the configuration deformations of the elastic portion 23 of the elastic member 21 during the adjustment of the intrinsic frequency of the dynamic damper 2. Hence, no difference occurs between the configuration deformations of the elastic portion 23 of the elastic member 21 and the configuration deformations of the elastic portion 24 of the elastic member 22 during the adjustment of the intrinsic frequency of the dynamic damper 2. Therefore, the shear spring constants exhibited in the elastic portion 23 agree with the shear spring constants exhibited in the elastic portion 24, and accordingly no resonance occurs except at the intrinsic frequency of the dynamic damper 2 adjusted to the dominant frequencies of the harmful vibrations excited in the rotary shaft "S".

In this way, the dynamic damper 2 of the second preferred embodiment can be also fixed around the rotary shaft "S" by installing the fixing band 27b only around the fixing portion 27 of the supporting portion 25 of the elastic member 21 without imparing its inherent performances. As a result, the number of the component parts and the man-hour requirements for the assembly have been also reduced. Therefore, the assembly operability can be also improved and the manufacturing cost can be also reduced by employing the dynamic damper 2 of the second preferred embodiment arranged in the above-mentioned manner.

Having now fully described the present invention, it will be apparent to one of ordinary skill in the art that many changes and modifications can be made thereto without departing from the spirit or scope of the present invention as set forth herein.

What is claimed is:

1. A dynamic damper comprising: a mass member formed in a cylinder shape, having an inner surface larger than the outer surface of a rotary shaft and inserted onto said rotary shaft;
  a first elastic member having a first fixing portion formed in a ring shape, inserted onto and supported on a portion of said rotary shaft spaced axially from a first end of said mass member and a first elastic portion integrally connecting said first fixing portion and said first end of said mass member;
  a second elastic member spaced axially away from said first elastic member having a second fixing portion formed in a ring shape inserted onto and supported on a portion of said rotary shaft spaced axially from a second end of said mass member and a second elastic portion integrally connecting said second fixing portion and said second end of said mass member; and
  said first fixing portion of said first elastic member having an engaging groove formed in a ring shape around an outer surface thereof, and the inner diameter of said first fixing portion thereof being larger than the inner diameter of said second fixing portion of said second elastic member.

2. The dynamic damper according to claim 1, wherein said inner diameter of said first fixing portion is smaller than the outer diameter of said rotary shaft by 0.5 to 1.0 mm, and said inner diameter of said second fixing portion is smaller than the outer diameter of said rotary shaft by 1.2 to 2.5 mm.

3. The dynamic damper according to claim 1, wherein said inner diameter of said first fixing portion falls in the range of 94 to 99% of said outer diameter of said rotary shaft, and said inner diameter of said second fixing portion falls in the range of 87 to 96% of said outer diameter of said rotary shaft.

4. The dynamic damper according to claim 1, wherein a fixing band is installed only around said engaging groove of said fixing portion of said elastic member, and said fixing portion is fixed around said rotary shaft by the tightening force of said fixing band.

5. The dynamic damper according to claim 1, wherein said mass member, said first elastic member and said second elastic member are integrally formed of a rubber material.

6. A dynamic damper comprising:
  a mass member formed in a cylinder shape, having an inner surface larger than the outer surface of a rotary shaft and inserted onto said rotary shaft;
  a pair of elastic members spaced axially away from each other disposed one at each end of said mass member, each said elastic member having a supporting portion formed in a ring shape, inserted onto and supported on said rotary shaft spaced axially from an end of said mass member and an elastic portion integrally connecting said supporting portion with said end of said mass member; and
  said supporting portion of one of said elastic members having a fixing portion having an engaging groove formed in a ring shape around an outer surface thereof, and an intermediate portion disposed between said fixing portion and said elastic portion and having a length at least equal to or larger than the length of said supporting portion of said other elastic member in the axial direction of said rotary shaft, wherein the effect of the deformation of said fixing portion substantially does not affect the elastic portion.

7. The dynamic damper according to claim 6, wherein the length of said intermediate portion of said supporting portion of one of said elastic members is larger than the length of said supporting portion of said other elastic member by 3 mm at least.

8. The dynamic damper according to claim 6, wherein said supporting portion of said other elastic member has the length of at least 5 mm in the axial direction of said rotary shaft, and said intermediate portion of said supporting portion of one of said elastic members has a length equal to the length of said supporting portion of said other elastic member in the axial direction of said rotary shaft.

9. The dynamic damper according to claim 6, wherein a fixing band is installed only around said engaging groove of said fixing portion of one of said elastic members, and said fixing portion is fixed around said rotary shaft by the tightening force of said fixing band.

10. The dynamic damper according to claim 6, wherein said mass member and said pair of said elastic members are integrally formed of a rubber material.

* * * * *